(12) United States Patent
De La Fuente et al.

(10) Patent No.: US 9,401,058 B2
(45) Date of Patent: Jul. 26, 2016

(54) ZONE BASED PRESENCE DETERMINATION VIA VOICEPRINT LOCATION AWARENESS

(75) Inventors: Stephanie De La Fuente, Dallas, TX (US); Gregory S. Jones, Lewisville, TX (US); John S. Pannell, Keller, TX (US)

(73) Assignee: International Business Machines Corporation, Armonk, NY (US)

( * ) Notice: Subject to any disclaimer, the term of this patent is extended or adjusted under 35 U.S.C. 154(b) by 802 days.

(21) Appl. No.: 13/361,353

(22) Filed: Jan. 30, 2012

(65) Prior Publication Data

US 2013/0195285 A1 Aug. 1, 2013

(51) Int. Cl.
| | | |
|---|---|---|
| H04R 3/00 | (2006.01) | |
| G07C 9/00 | (2006.01) | |
| H04R 29/00 | (2006.01) | |
| G01S 5/18 | (2006.01) | |
| G01S 5/02 | (2010.01) | |

(52) U.S. Cl.
CPC ............... *G07C 9/00158* (2013.01); *G01S 5/18* (2013.01); *H04R 29/005* (2013.01); *G01S 5/0252* (2013.01); *H04R 3/005* (2013.01); *H04R 2201/405* (2013.01)

(58) Field of Classification Search
None
See application file for complete search history.

(56) References Cited

U.S. PATENT DOCUMENTS

| | | |
|---|---|---|
| 5,878,400 A | 3/1999 | Carter, III |
| 5,905,973 A | 5/1999 | Yonezawa et al. |
| 6,247,130 B1 | 6/2001 | Fritsch |
| 6,266,649 B1 | 7/2001 | Linden et al. |
| 6,269,343 B1 | 7/2001 | Pallakoff |
| 6,473,738 B1 | 10/2002 | Garrett |
| 6,850,899 B1 | 2/2005 | Chow et al. |
| 6,873,968 B2 | 3/2005 | Ehrlich et al. |
| 6,876,977 B1 | 4/2005 | Marks |

(Continued)

FOREIGN PATENT DOCUMENTS

| | | |
|---|---|---|
| EP | 1170690 A1 | 1/2002 |
| EP | 1513345 A1 | 3/2005 |

(Continued)

OTHER PUBLICATIONS

Klassen, et al.; "Speech-Based Localization of Multiple Persons for an Interface Robot"; Cont. Ttl.: Proceedings. 2005 IEEE International Symposium on Computational Intelligence in Robotics and Automation; 2005; Publisher IEEE, Piscataway, NJ; USA; ISBN: 0-7803-9355-4; Database: INSPEC.

(Continued)

*Primary Examiner* — Joseph Saunders, Jr.
*Assistant Examiner* — James Mooney
(74) *Attorney, Agent, or Firm* — Steven M. Greenberg, Esq.; CRGO Law (57) ABSTRACT

A speech from a speaker proximate to one or more microphones within an environment can be received. The microphones can be a directional microphone or an omni-directional microphone. The speech can be processed to produce an utterance to determine the identity of the speaker. The identity of the speaker can be associated with a voiceprint. The identity can be associated with a user's credentials of a computing system. The credentials can uniquely identify the user within the computing system. The utterance can be analyzed to establish a zone in which the speaker is present. The zone can be a bounded region within the environment. The zone can be mapped within the environment to determine a location of the speaker. The location can be a relative or an absolute location.

24 Claims, 3 Drawing Sheets

(56) References Cited

U.S. PATENT DOCUMENTS

| | | |
|---|---|---|
| 6,912,507 B1 | 6/2005 | Phillips et al. |
| 6,925,444 B1 | 8/2005 | McCollom et al. |
| 7,356,490 B1 | 4/2008 | Jacobi et al. |
| 7,364,070 B2 | 4/2008 | Chang |
| 7,480,627 B1 | 1/2009 | Van Horn et al. |
| 7,599,904 B2 | 10/2009 | Yoshida et al. |
| 7,620,404 B2 | 11/2009 | Chesnais et al. |
| 7,647,247 B2 | 1/2010 | Abraham et al. |
| 7,672,844 B2 | 3/2010 | Masuda et al. |
| 7,843,486 B1* | 11/2010 | Blair et al. ............... 348/14.01 |
| 7,970,661 B1 | 6/2011 | Abraham et al. |
| 8,045,418 B2 | 10/2011 | Suzuki |
| 8,418,919 B1 | 4/2013 | Beyda |
| 9,098,583 B2 | 8/2015 | Kwan et al. |
| 2002/0022957 A1 | 2/2002 | Kiuchi et al. |
| 2002/0052948 A1 | 5/2002 | Baudu et al. |
| 2002/0113123 A1 | 8/2002 | Otto et al. |
| 2003/0046084 A1 | 3/2003 | Wyman |
| 2003/0126040 A1 | 7/2003 | Mesaros |
| 2005/0022119 A1 | 1/2005 | Kraemer |
| 2005/0033656 A1 | 2/2005 | Wang et al. |
| 2005/0060148 A1* | 3/2005 | Masuda et al. ............... 704/231 |
| 2005/0096997 A1 | 5/2005 | Jain et al. |
| 2005/0114228 A1 | 5/2005 | Wadhwani |
| 2005/0177446 A1 | 8/2005 | Hoblit |
| 2006/0029190 A1* | 2/2006 | Schultz ............... 379/88.01 |
| 2006/0122895 A1 | 6/2006 | Abraham et al. |
| 2006/0283938 A1 | 12/2006 | Kumar et al. |
| 2007/0078727 A1 | 4/2007 | Spiegel et al. |
| 2007/0179867 A1 | 8/2007 | Glazer et al. |
| 2007/0214271 A1 | 9/2007 | Griffin et al. |
| 2007/0239552 A1 | 10/2007 | Sundaresan |
| 2008/0040240 A1 | 2/2008 | Covington et al. |
| 2008/0046331 A1 | 2/2008 | Rand |
| 2008/0091425 A1 | 4/2008 | Kane |
| 2008/0162198 A1* | 7/2008 | Jabbour et al. ............... 705/5 |
| 2009/0043670 A1 | 2/2009 | Johansson et al. |
| 2009/0043674 A1 | 2/2009 | Minsky et al. |
| 2009/0046841 A1* | 2/2009 | Hodge ............... 379/189 |
| 2009/0106085 A1 | 4/2009 | Raimbeault |
| 2009/0172565 A1 | 7/2009 | Jackson et al. |
| 2009/0265255 A1 | 10/2009 | Jackson et al. |
| 2010/0020951 A1* | 1/2010 | Basart et al. ............... 379/142.01 |
| 2010/0030578 A1 | 2/2010 | Siddique et al. |
| 2010/0030662 A1 | 2/2010 | Klein |
| 2010/0119046 A1 | 5/2010 | Hoblit et al. |
| 2010/0223147 A1 | 9/2010 | Oishi |
| 2011/0016023 A1 | 1/2011 | Zakas |
| 2011/0054909 A1 | 3/2011 | Bruekers et al. |
| 2011/0271204 A1* | 11/2011 | Jones et al. ............... 715/753 |
| 2012/0185355 A1 | 7/2012 | Kilroy |
| 2013/0044893 A1* | 2/2013 | Mauchly et al. ............... 381/92 |
| 2013/0195285 A1 | 8/2013 | De La Fuente et al. |
| 2013/0210461 A1 | 8/2013 | Moldavsky et al. |
| 2013/0211953 A1 | 8/2013 | Abraham et al. |

FOREIGN PATENT DOCUMENTS

| | | |
|---|---|---|
| GB | 2458388 A | 9/2009 |
| JP | 2001204092 A | 7/2001 |
| WO | 0127837 A2 | 4/2001 |

OTHER PUBLICATIONS

Puglia S, et al., "MultECommerce: A Distributed Architecture for Collaborative Shopping on the WWW," EC'00, Proceedings of the 2nd ACM Conference on Electronic Commerce, 215-24, 2000.

* cited by examiner

ZONE BASED PRESENCE DETERMINATION VIA VOICEPRINT LOCATION AWARENESS

BACKGROUND

The present invention relates to the field of presence determination and, more particularly, to zone based presence determination via voiceprint location awareness.

Locating personnel within large facilities (e.g., workplaces) is becoming increasingly important to daily business operations. Operations can often include organizing meetings, securing resources, and coordinating personnel activities. For example, high rise office buildings (e.g., multi-story offices) often house many company divisions within a single building which can include hundreds of personnel distributed over many floors. Frequently, managing business operations within these large facilities can be daunting. That is, as ubiquitous computing (e.g., mobile computers) allows the personnel to move freely within these large facilities, determining the location (e.g., presence) can be time consuming and difficult. Facilities which lack presence solutions often resort to manual coordinating efforts such as contacting personnel directly to determine the personnel location. These manual efforts can reduce productivity and frequently result in frustration of personnel attempting to conduct business operations.

Alternatively, facilities can be outfitted with traditional presence solutions. Traditional presence solutions frequently rely on Radio Frequency Identification (RFID), Ultrasound, Wireless Fidelity (WiFi), Global Positioning System (GPS), and other technologies to determine personnel location. These solutions typically involve using a uniquely identified tag which must be worn by personnel (e.g., authorized persons, visitors, residents, etc.) for presence systems to recognize and identify the personnel's location. Drawbacks of this system often include inaccurate association of tags to individuals, cost of acquiring tags for individuals within a facility, limited battery life of tags, lost tags, replacement expenses of lost tags, and inconsistent usage of tags. These drawbacks can quickly create significant hurdles to adopting invaluable presence technologies within these large facilities.

BRIEF SUMMARY

One aspect of the present invention can include a system, an apparatus, a computer program product, and a method for zone based presence determination via voiceprint location awareness. A speech from a speaker proximate to one or more microphones within an environment can be received. The microphones can be a directional microphone or an omnidirectional microphone. The speaker can be a person. The speech can be processed to produce an utterance to determine the identity of the speaker. The identity of the speaker can be associated with a voiceprint. The identity can be associated with user credentials of a computing system. The credentials can uniquely identify the user within the computing system. The utterance can be analyzed to establish a zone in which the speaker is present. The zone can be a bounded region within the environment. The zone can be mapped within the environment to determine a location of the speaker. The location can be a relative or an absolute location.

Another aspect of the present invention can include a method, an apparatus, a computer program product, and a system for zone based presence determination via voiceprint location awareness. A speech engine can be configured to determine the location of a speaker within an environment based on a received speech utterance. The utterance can be received from one or more microphones proximate to the speaker. The location can be one or more zones within the environment. The utterance can be matched to a voiceprint. The voiceprint can be associated to a speaker identity. A data store can be able to persist one or more voiceprints associated with a speaker identity and a mapping. The speaker identity can be associated with a user credential of a computing system. The mapping can associate one or more zones with the environment.

DETAILED DESCRIPTION

The present disclosure is a solution for zone based presence determination via voiceprint location awareness. In the solution, an array of microphones distributed throughout an environment (e.g., facility) can be utilized to establish a speaker (e.g., personnel) presence within the facility. In one embodiment, a microphone can be placed into each room of the facility where each microphone location can be mapped to a zone of the facility. In the embodiment, when the microphone detects speech from a speaker, a voiceprint associated with the speaker can be utilized to uniquely identify and locate the speaker within a zone. The disclosure can perform voiceprint creation, speaker identification, speaker verification, presence determination, and the like. In one embodiment, the disclosure can be a current Real Time Location Service (RTLS) lacking tracking devices. In one configuration of the embodiment, the RTLS can be capable of automatically reacting to speech from personnel even when personnel voiceprints have not been registered with the service.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
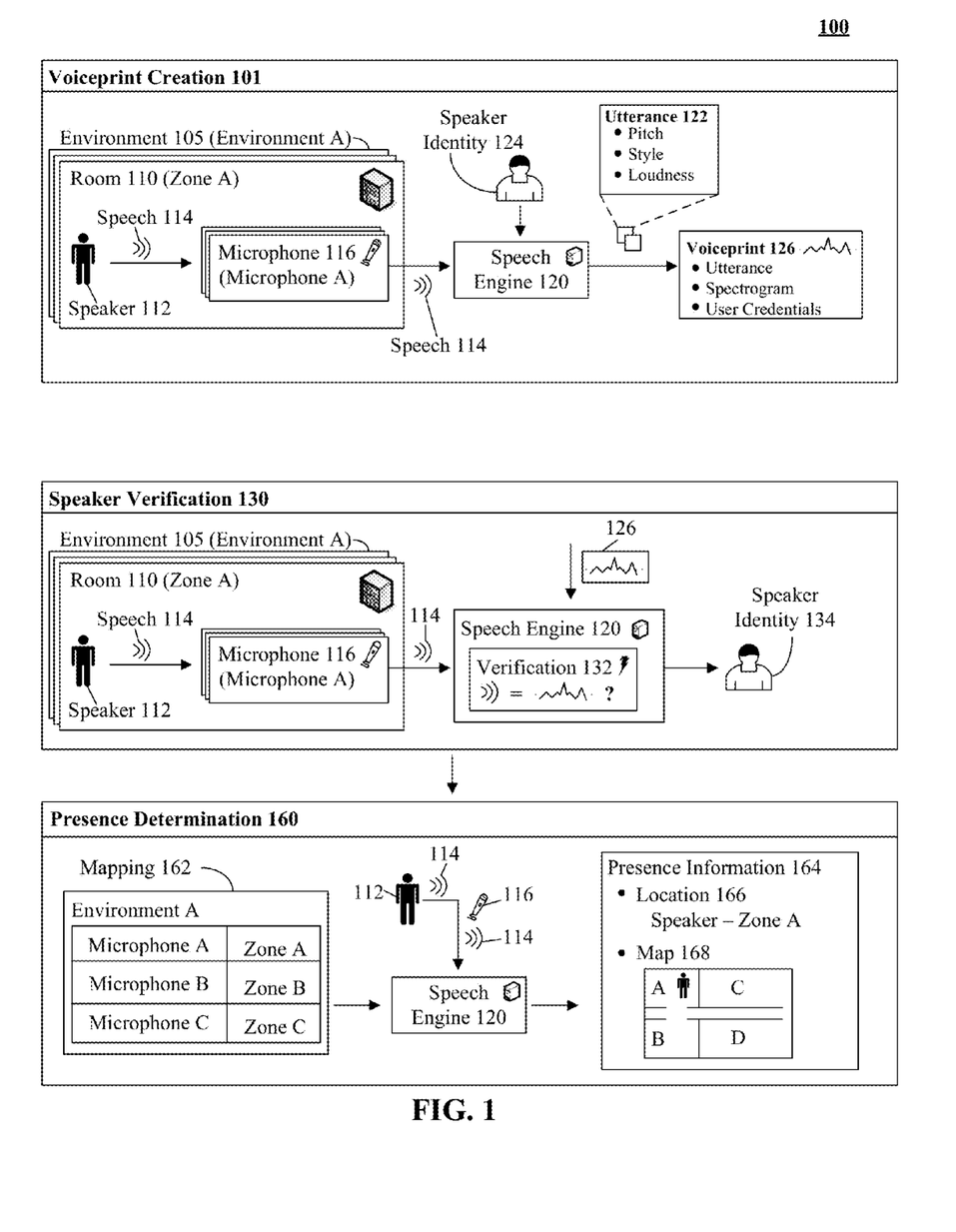
FIG. 1 is a schematic diagram illustrating a scenario for zone based presence determination via voiceprint location awareness in accordance with an embodiment of the inventive arrangements disclosed herein.

FIG. 1 is a schematic diagram illustrating a scenario 100 for zone based presence determination via voiceprint location awareness in accordance with an embodiment of the inventive arrangements disclosed herein. Scenario 100 can be performed in the context of method 200 and/or system 300. In scenario 100, a voiceprint creation 101, speaker verification 130, presence determination 160 can be stages enabling the disclosure functionality. It should be appreciated that stage 101 can be performed independently and/or can be a stage dependent processing of a presence determination process (e.g., 130, 160). It should be understood that stages 101, 130, 160 can be performed concurrently or in sequence. In voiceprint creation 101, a speech 114 received by microphone 116 can be associated with speaker identity 124 to establish a voiceprint 126 for speaker 112. In speaker verification 130, an existing voiceprint 126 can be utilized to identify speaker 112 based on speech 114. In presence determination 160, mapping 162 can be employed to establish presence information 164 associated with speaker 112.

As used herein, environment 105 can be a built environment providing the setting for personnel (e.g., speaker 112) activity. Environment 105 can include, but is not limited to, a building, a neighborhood, a city, a geographically bounded region, and the like. For example, environment 105 can be a college campus. In one embodiment, environment 105 can be divided into one or more zones (e.g., Zone A). A zone can logically and/or physically separate portions of environment 105.

Room 110 can be a distinguishable space within an environment 105. Room 110 can include, but is not limited to, a room (e.g., room 110), a passageway, a public area, and the like. Room 110 can include microphone 116 which can be a fixed or movable microphone. Microphone 116 can include, but is not limited to, a single microphone, multiple communicatively linked microphones, multiple independent microphones, and the like.

In one instance, microphone 116 can be a component of an audio/video device. For example, microphone 116 can be a microphone associated with a security camera. Microphone 116 can detect speech 114 from a proximate speaker 112. Speaker 112 can be an individual proximate to microphone 114 producing speech 114. Speech 114 is a vocalized form of communication which can be received by microphone 114. Speech 114 can include traditional language constructs including, but not limited to, sentences, words, syllables, and the like. That is, speech 114 can include isolated words, connected words, and continuous speech. Speech 114 can include, but is not limited to, one or more languages. It should be appreciated that speech 114 can be directed at microphone 114 and/or indirect (e.g., ambient noise). For example, speech 114 can include a speaker 112 within room 110 communicating with another person within the room.

Microphone 116 can convey speech 114 to speech engine 120. Engine 120 can process speech 114 into one or more utterances 122. Utterance 122 can be a complete unit of speech in spoken language. Utterance 122 can be associated with one or more attributes, including, but not limited to, pitch, style, loudness, and the like. That is, utterance 122 can be an artifact of a speech recognition process. Combining speaker identity 124 with utterance 122, engine 120 can produce voiceprint 126.

Voiceprint 126 can be a unique data set associating a speech 114 (e.g., utterance) with a speaker identity (e.g., user credentials). In one embodiment, voiceprint 126 can be a time-varying spectral representation of a speech signal. In the embodiment, the signal can be utilized to uniquely identify a speaker. For example, voiceprint 126 can be a speech behavioral biometric utilized within a computing security system. Voiceprint 126 can include, but is not limited to, utterance 122, spectrogram, user credentials, and the like. Voiceprint 126 can include a single unique voiceprint, multiple voiceprints, and the like. Voiceprint 126 can include, but is not limited to, a template, a speech model (e.g., Hidden Markov Model), and the like. It should be appreciated that utterance stored within voiceprint can include utterance attributes (e.g., speaker dependent characteristics). In one embodiment, user credentials associated with voiceprint 126 and can be utilized to determine a speaker identity.

In speaker verification 130, a previously established voiceprint 126 can be utilized to verify the identity of a speaker 112. In speaker verification 130, a verification 132 action can be performed on speech 114 and voiceprint 126. Verification 132 can include decoding speech 114, matching speech 114 to a voiceprint 126, and the like. In one instance, engine 120 can compare utterance attributes of speech 114 with utterance attributes associated with voiceprint 126. It should be appreciated that verification 132 can be arbitrarily complex and can utilize one or more rulesets, settings, and the like. That is, verification 132 can be a robust and extensible allowing the disclosure to be adapted to a wide variety of implementations.

When a speech 114 matches a voiceprint 126, the speaker identity 134 can be determined through use of user credentials associated with voiceprint 126. When a speech 114 does not match a voiceprint 126, the speaker identity 134 can be set to a guest identity. In one instance, the guest identity can be manually assigned to a registered user of a system (e.g., system 300) when credentials are manually provided. In another instance, the guest identity can be automatically assigned to a registered user of a system (e.g., system 300) when the speaker 112 interacts with devices which automatically provide credentials to the system.

In presence determination 160, mapping 162 can enable zone based presence determination of speaker 112. Mapping 162 can associate a microphone 116 (e.g., microphone A) with a location (e.g., Zone A). Speech 114 from speaker 112 can be received by microphone 116 and can be communicated to engine 120. Engine 120 can utilize mapping to identify the microphone which received speech 114 and determine speaker location. For example, microphone A can be identified via unique device identifier which can be associated with a Zone A.

Engine 120 can generate presence information 164 which can be data associated with a speaker 112 location. Presence information 164 can include, but is not limited to location 166, map 168, and the like. In one instance, information 164 can include a status indicator conveying the availability of speaker 112. Location 166 can be an absolute location and/or a relative location. For example, when a speaker 112 is proximate to microphone 116 (e.g., microphone A), but is not within room 110 (e.g., Zone A), a relative location (e.g., near Zone A) can be established. Map 168 can be a graphical element conveying the location of speaker 112 within environment 105. For example, map 168 can be a floorplan of a building indicating speaker 112 is in Zone A (e.g., room 110). Map 168 can show one or more speakers and appropriate locations which can be tracked by the disclosure. In one instance, map 168 can show historic locations of a speaker permitting visual tracking capabilities.

In one embodiment, the disclosure can enable zone-based presence determination of multiple speakers simultaneously. In another embodiment, the disclosure can facilitate presence tracking of one or more speakers. It should be appreciated that the environment 105 configuration described within scenario 100 can be an exemplary setup. The disclosure can support multiple microphones within a single zone, multiple zones each equipped with multiple microphones, and the like.

Drawings presented herein are for illustrative purposes only and should not be construed to limit the invention in any regard. It should be understood that stages 101, 130, 160 can be optional providing that the disclosure functionality is maintained. It should be appreciated that speaker identity 124 can be manually provided to engine 120. In one instance, speaker 112 interacting with a computing system login process can manually input identity 124. In the instance, user credentials can be validated and a speaker identity can be determined. It should be understood that although scenario 100 describes a zone based presence determination capability, the disclosure is not limited in this regard. Further, the disclosure can be extended to provide presence determination capabilities for multiple environments 105. It should be appreciated that the engine 120 can be a text independent speech processor but can support text dependent implementations.

Figure 2:
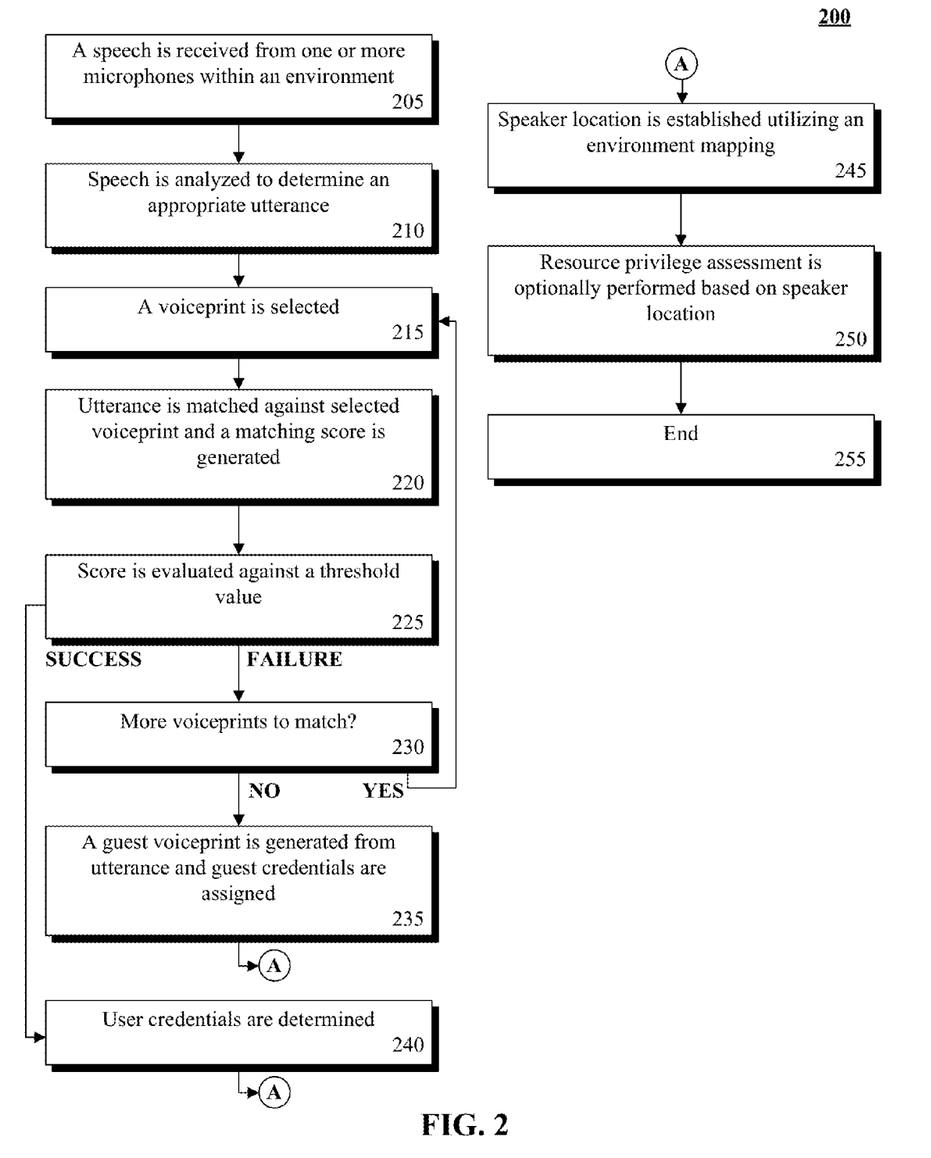
FIG. 2 is a schematic diagram illustrating a method zone based presence determination via voiceprint location awareness in accordance with an embodiment of the inventive arrangements disclosed herein.

FIG. 2 is a schematic diagram illustrating a method 200 zone based presence determination via voiceprint location awareness in accordance with an embodiment of the inventive arrangements disclosed herein. Method 200 can be performed in the context of scenario 100 and/or system 300. In method 200, a speech received by a microphone can be utilized to validate a speaker identity and locate the speaker within an environment.

In step 205, a speech can be received from one or more microphones within an environment. For example, a conference room can be equipped with an array of microphones which can be utilized to obtain speech from a speaker. In step 210, the speech can be analyzed to determine an appropriate utterance. Analysis can include, but is not limited to, signal processing, speech decoding, normalization, and the like. The analysis can produce an utterance which can include phenomes, words, and the like. The utterance can be a data model such as a vocabulary. In step 215, a voiceprint can be selected. In step 220, the utterance can be matched against the selected voiceprint and a matching score can be generated. The matching score can be a numerical value, a fuzzy logic value, and the like. For example, score can be a numerical value such as a percentage. In one embodiment, matching score can be a confidence value indicating the likelihood a positive validation has occurred.

In step 225, score can be evaluated against a threshold value. The threshold value can be manually and/or automatically established. Threshold value can be a numeric value, a fuzzy logic value, and the like. In one instance, the threshold value can be a ruleset which can permit programmatic actions to be triggered from the evaluation. In the instance, the ruleset can permit sophisticated logic to be established based on the result of the evaluation. For example, when the score is lower than the threshold value, a notification can be conveyed to an administrator indicating the detection of a guest within the environment. When the evaluation results in failure, the method can continue to step 230, else proceed to step 240. In step 230, if there are more voiceprints to match, the method can return to step 215. It should be appreciated that the method 200 can support multiple voiceprints for a speaker. In one embodiment, when step 215 is repeated, an alternative voiceprint associated with a speaker identity can be selected and steps 220-225 can be performed. In the embodiment, the steps 215-225 can be run until all voiceprints are exhausted or a match occurs.

In step 235, a guest voiceprint can be generated from the utterance and guest credentials can be assigned. A guest voiceprint can be generated using similar processes described within voiceprint creation 101 of scenario 100. Guest credentials can be assigned manually and/or automatically. In step 240, user credentials can be determined. Credentials can be determined based on one or more rulesets, settings, and the like. In one instance, credentials can be automatically obtained from an authentication system. In step 245, speaker location can be established utilizing an environment mapping. In step 250, resource privilege assessment can be optionally performed based on speaker location. In one instance, the method 200 can be a process of a presence based security system. In the instance, when speaker location is determined, a security action (e.g., granting access to a resource) can be enacted. For example, when a speaker is proximate to a locked door associated with a secure area, the method 200 can be utilized to automatically unlock the door. In step 255, the method can end.

Drawings presented herein are for illustrative purposes only and should not be construed to limit the invention in any regard. Method 200 can be performed in real-time or near real-time. Steps 205-255 within method 200 can performed in serial and/or in parallel. One or more steps 205-255 can be optional permitting method 200 functionality is retained.

Figure 3:
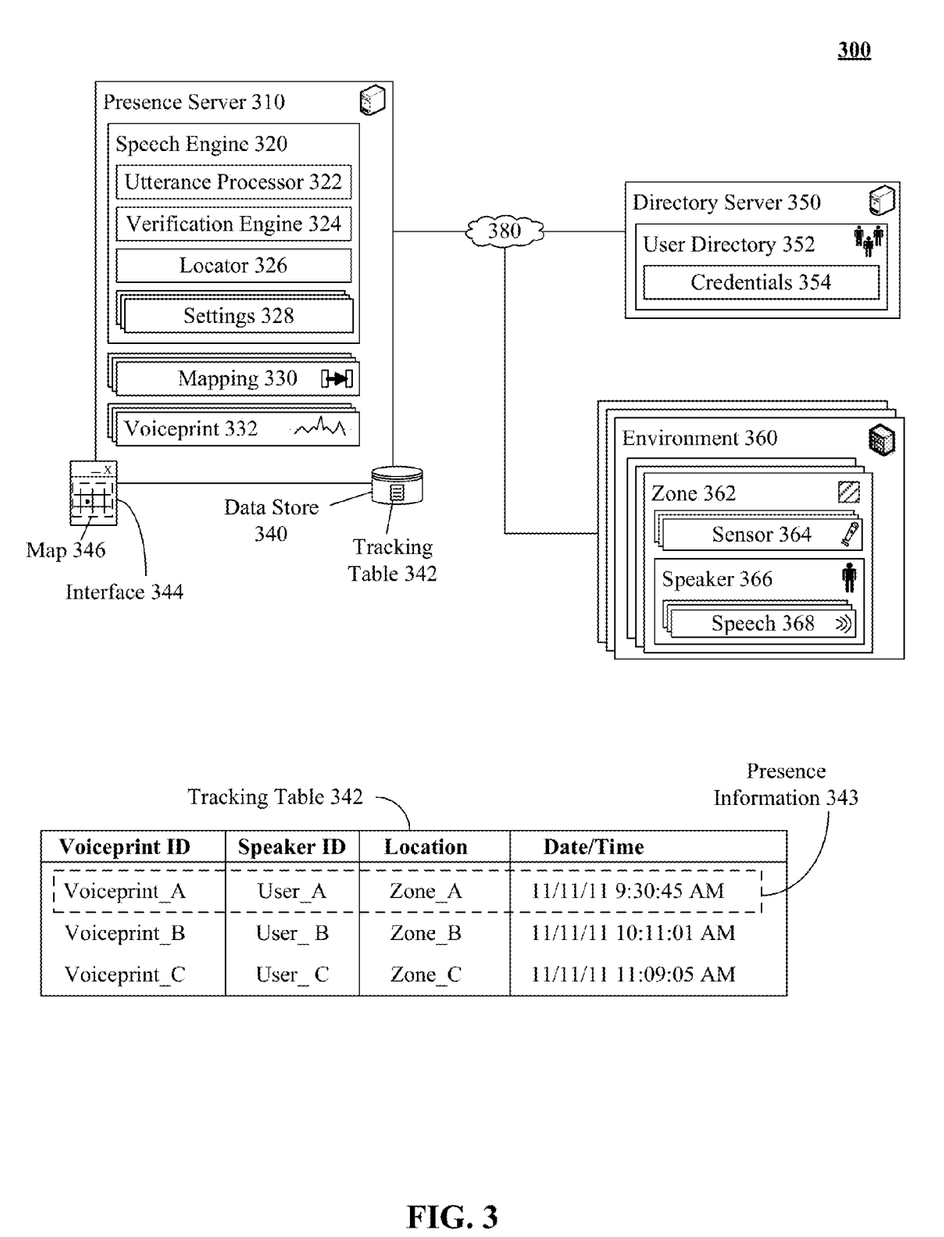
FIG. 3 is a schematic diagram illustrating a system for zone based presence determination via voiceprint location awareness in accordance with an embodiment of the inventive arrangements disclosed herein.

FIG. 3 is a schematic diagram illustrating a system 300 for zone based presence determination via voiceprint location awareness in accordance with an embodiment of the inventive arrangements disclosed herein. System 300 can be performed in the context of scenario 100 and/or method 200. In system 300, a speech engine 320 can permit real-time speaker presence determination of speaker 366 via speech 368. For example, as speaker 366 moves within zones 362 and/or environments 360, engine 320 can utilize speech 368 to rapidly determine speaker location. System 300 components 310, 350, and 360 can be communicatively linked via network 380. It should be appreciated that system 300 can facilitate unified communication collaboration permitting traditional and/or proprietary unified communication actions to be triggered from system 300. For example, based on presence determination of speaker 366 from speech 368, a phone call can be automatically forwarded to a telephone proximate to the speaker 366.

In one embodiment, system 300 can be a "drop-in" solution for presence determination within an existing computing infrastructure. For example, engine 320 can be a plug-in component of a presence server application. In another embodiment, system 300 can be configured to be integrated with an existing presence system to enhance and/or extend presence system functionality.

Presence server 310 can be a hardware/software element able to accept, store, and/or distribute presence information (e.g., presence information 343). Server 310 can include, but is not limited to, speech engine 320, mapping 330, voiceprint 332, data store 340, interface 344, and the like. Server 310 can communicate with presentities, watchers, services, and the like. In one embodiment, server 310 can be a component of a unified communications system. In the embodiment, server 310 can be an IBM LOTUS SAMETIME server.

Speech engine 320 can be a hardware/software entity able to receive speech 368, identify speaker 366, validate speaker 366, and/or determine speaker 366 location. Engine 320 can include, but is not limited to, utterance processor 322, verification engine 324, locator 326, settings 328, and the like. Engine 320 can be a networked computing element, distributed computing element, and the like. In one instance, engine 320 functionality can be a portion of a Web service. In another instance, engine 320 functionality can be a capability of an Application Programming Interface (API).

Utterance processor 322 can be a hardware/software component configured to process speech 368. Processor 322 functionality can include, but is not limited to, voice recognition, speech recognition, speech coding, speech recording, speech playback, normalization (e.g., cepstral normalization), and the like. Processor 322 can include one or more statistically-based speech recognition algorithms. For example, processor 322 can utilize acoustic modeling and/or language modeling to process speech 368. It should be appreciated that processor 322 can include traditional and/or proprietary speech recognition technologies. In one instance, processor 322 can be utilized to create voiceprint 332. In the instance, processor 322 can utilize traditional and/or proprietary technologies to process and/or store voiceprint 332. Technologies can include, but is not limited to, frequency estimation, Hidden Markov Models (HMM), Gaussian mixture models, pattern matching algorithms, neural networks, matrix representation, Vector Quantization, decision trees, and the like. It should be appreciated that processor 322 can utilize "anti-speaker" techniques, including, but not limited to, cohort models, world models, and the like.

Verification engine 324 can be a hardware/software element for identifying and/or verifying speaker 366. Engine 324 functionality can include directory service 350 communication, credential 354 verification, speaker recognition, and the like. Engine 324 can perform verification actions including, but not limited to, template matching, ruleset evaluation, and the like. Verification engine 324 can perform directory service 350 assisted actions including, but not limited to, directory 352 creation (e.g., guest directory), credential 354 creation (e.g., enrollment), and the like.

Locator 326 can be a hardware/software component configured to perform presence determination of speaker 366 based on speech 368. Locator 326 functionality can include, but is not limited to, presence determination, presence tracking, presence information distribution, and the like. Locator 326 can be utilized to create and/or manage table 342. Locator 326 can update table 342 in response to determining that speaker's 366 location has changed. In one instance, locator 326 can be an optional component of speech engine 320. In the instance, locator 326 can be an external presence component (e.g., unified communications presence engine) communicatively linked to engine 320.

Settings 328 can be one or more configuration options for establishing the behavior of system 300 and/or server 310. Setting 328 can include, but is not limited to, utterance processor 322 options, identity engine 324 settings, locator 326 options, and the like. Settings 328 can be manually and/or automatically configured. In one instance, settings 328 can be heuristically determined from communicatively linked presence systems. In one instance, settings 328 can be presented within interface 344. In the instance, settings 328 can be managed and/or configured utilizing traditional and/or proprietary interface mechanisms.

Mapping 330 can be a data set linking sensor 364 (e.g., microphone) to a zone 362 within environment 360. Mapping 330 can be manually and/or automatically established. Mapping 330 can be dynamically updated when changes to environment 360, zone 362, and/or sensor 364 occurs. In one instance, mapping 330 can be managed via one or more user interfaces.

Voiceprint 332 can be stored within server 310, engine 320, data store 340, and the like. In one embodiment, voiceprint 332 can enable multiple language support. In the embodiment, voiceprint 332 can include multiple language voiceprints for a single speaker. It should be appreciated that voiceprint 332 can be associated with one or more security mechanisms. Voiceprint 332 can be associated with speaker characteristics.

Data store 340 can be a hardware/software component able to persist tracking table 342, mapping 330, voiceprint 332, map 346, and the like. Data store 340 can be a Storage Area Network (SAN), Network Attached Storage (NAS), and the like. Data store 340 can conform to a relational database management system (RDBMS), object oriented database management system (OODBMS), and the like. Data store 340 can be communicatively linked to server 310 in one or more traditional and/or proprietary mechanisms. In one instance, data store 340 can be a component of Structured Query Language (SQL) complaint database. In another instance, data store 340 can be a portion of a speech database.

Tracking table 342 can be a data set for enabling presence accounting for one or more speakers 366. Table 342 can include, but is not limited to, presence information 343, voiceprint information, credentials, and the like. In one instance, system 300 can enable presence tracking via tracking table 342 which can include presence information about one or more speakers 366. In another instance, tracking table 342 can employ historic locations of speaker 366 to forecast subsequent speaker 366 location. It should be appreciated that table 342 is presented for exemplary purposes only and should not be construed to limit the invention in any regard.

Presence information 343 can include location information, timing information (e.g., date/time), an environment map, and the like. Presence information 343 can be communicated to one or more components within system 300. In one instance, information 343 can be conveyed to components of a unified communications system. In the instance, information 343 can be delivered to presence aware applications (e.g., Instant Messenger, conferencing application, etc).

Interface 344 can be a user interactive component permitting interaction and/or presentation of map 346. Interface 344 can be present within the context of a Web browser application, a desktop application, and the like. In one embodiment, interface 344 can be a screen of an IBM LOTUS SAMETIME application. Interface 344 capabilities can include a graphical user interface (GUI), voice user interface (VUI), mixed-mode interface, and the like. In one instance, interface 344 can be communicatively linked to computing device (e.g., client device).

Map 346 can be a data set for presenting speaker 366 presence information. In one instance, map 346 can be dynamically generated on request. In another instance, map 346 can be persistent and can be continually updated during system 300 runtime. In one embodiment, map 346 can be a graphically interactive map permitting interaction with presence information associated with a speaker.

Directory server 350 can be a hardware/software component for storing, organizing and providing access to information within user directory 352. Server 350 can include traditional and/or proprietary implementations. In one instance, server 350 can be an IBM LOTUS DOMINO server. Server 350 can include, but is not limited to, user directory 352, server 350 settings, and the like. User directory 352 can be a data set utilized for authenticating and authorizing of users (e.g., speaker 366). Directory 352 can include, but is not limited to, credentials 354, access permissions, and the like. Credentials 354 can be associated with a user profile, user data, and the like.

Sensor 364 can be a device able to detect proximate speech 368 from speaker 366. For example, sensor 364 can be an acoustic-to-electric transducer. Sensor 364 can be a dynamic microphone, piezoeletric microphone, fiber optic microphone, and the like. It should be appreciated that sensor 364 can be a wired device and/or wireless device. Sensor 364 can include, but is not limited to, a fixed sensor, a movable sensor, and the like.

Network 380 can be an electrical and/or computer network connecting one or more system 300 components. Network 380 can include, but is not limited to, twisted pair cabling, optical fiber, coaxial cable, and the like. Network 380 can include any combination of wired and/or wireless components. Network 380 topologies can include, but is not limited to, bus, star, mesh, and the like. Network 380 types can include, but is not limited to, Local Area Network (LAN), Wide Area Network (WAN), VPN, and the like. Network 380 can include, but is not limited to, an Internet, intranet, extranet, and the like.

In one embodiment, system 300 can adapt voiceprints (e.g., speaker models) after each successful verification to capture long-term changes in the voice of a speaker. For example, a speaker's 366 voice can change due to ageing which can affect speech 368.

Drawings presented herein are for illustrative purposes only and should not be construed to limit the invention any regard. System 300 can employ traditional and/or proprietary technologies. System 300 can utilize traditional and/or proprietary protocols. Protocols can include, but is not limited to, Hypertext Transport Protocol (HTTP), Transport Control Protocol (TCP), Internet Protocol (IP), Lightweight Directory Access Protocol (LDAP), Real-time Transport Protocol (RTP), Extensible Messaging and Presence Protocol (XMPP), and the like. System 300 can conform to a networked computing environment, distributed computing environment, cloud computing environment, and the like. In one instance, system 300 architecture can be a Service Oriented Architecture.

It should be appreciated that system 300 implementation details can vary based on deployment requirements and/or limitations. For example, system 300 can be utilized for state and/or national public safety, security associated correctional facilities, automated attendance monitoring, assisting investigations (e.g., confirming alibis), law enforcement activities (e.g., locating perpetrators), and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for voiceprint based location awareness comprising:
receiving a speech from a speaker proximate to at least one of a plurality of microphones within an environment;
processing the speech to produce an utterance to determine the identity of the speaker, wherein the identity of the speaker is associated with a voiceprint, wherein the identity is associated with a user credentials of a computing system, wherein the user credentials uniquely identifies the user within the computing system;
analyzing the utterance to establish a zone in which the speaker is present, wherein the zone is a bounded region within the environment, wherein the analyzing comprises of at least one triangulation computation that determines a user location based in part upon acoustic echoes unique to the bounded region resulting from the speech or from ambient noise in the environment; and
mapping the zone within the environment to determine a location of the speaker.

2. The method of claim 1, wherein the plurality of microphones is at least one of a directional microphone and an omni-directional microphone, wherein the speaker is a person authorized to access the computing system, wherein the computing system is owned by an entity that employs the person, wherein the location is at least one of a relative and absolute location.

3. The method of claim 1, further comprising:
identifying a voiceprint database, wherein the voiceprint database comprises of at least one voiceprint associated with a speaker; and
matching the utterance of the speaker to a voiceprint within the voiceprint database.

4. The method of claim 3, wherein the matching fails to match an utterance of the speaker to a voiceprint within the voiceprint database, establishing the speaker identity as a guest to the zone, wherein a plurality of people authorized to be in the zone by an entity owning or leasing the bounded region each have user-specific voiceprints stored.

5. The method of claim 1, further comprising:
receiving a voiceprint from a computing device associated with the speaker identity, wherein the speaker identity is associated with a user of the computing system;
storing the voiceprint and a speaker identity within a voiceprint database;
subsequently determining the identity of the speaker based on a speech utterance associated with the user, wherein the determining matches the identity of a speaker to a voiceprint within the voiceprint database; and
establishing the location of the speaker via the speech utterance.

6. The method of claim 1, further comprising:
continuously tracking a plurality of locations associated with the speaker within the environment based on subsequent utterances, wherein the plurality of locations is a plurality of zones within the environment.

7. The method of claim 6, further comprising:
evaluating the plurality of locations associated with the speaker; and forecasting a subsequent location associated with the speaker based on the evaluating.

8. The method of claim 1, wherein the zone is at least one of a room, a building, and a geographically bounded region.

9. The method of claim 1, confirming the geographic region using a GPS equipped device, wherein mapping of the zone for the speaker based on the voice print is used to supplement presence data for enclosed environments where GPS signals are unreliable due to radio frequency interference.

10. A system for voiceprint based location awareness comprising:
a speech engine configured to determine the location of a speaker within an environment based on a received speech utterance; wherein the utterance is received from a plurality of microphones proximate to the speaker, wherein the location is at least one of a plurality of zones within the environment, wherein the utterance is matched to a voiceprint, wherein the voiceprint is associated to a speaker identity, wherein the location information is provided as presence information to telephonic network, wherein the speech engine analyzes the received speech utterance to establish one of the zones in which the speaker is present, wherein the zone is a bounded region within the environment, wherein the analyzing comprises a triangulation computation that determines the location based in part upon acoustic echoes unique to the bounded region resulting from the speech or from ambient noise in the environment; and
a data store able to persist at least one voiceprint associated with a speaker identity and a mapping, wherein the speaker identity is associated with a user credential of a computing system, wherein the mapping associates at least one of the plurality of zones with the environment.

11. The system of claim 10, further comprising:
an utterance processor able to determine an utterance associated with a speaker within the environment;
a verification engine configured to establish the identity of the speaker based on the utterance, wherein the identity of the speaker is associated with a voiceprint, wherein the voiceprint is matched against the utterance; and
a locator capable of identifying a zone within the environment in which the speaker is present.

12. The system of claim 10, wherein each of the plurality of microphones is associated with each of the plurality of zones within the environment, wherein the plurality of microphones is at least one of a direction and an omni-directional microphone.

13. The system of claim 10, wherein at least one of the plurality of zones is at least one of a room, a building, and a geographically bounded region.

14. The system of claim 10, wherein the location is at least one of a Global Positioning System (GPS) location and a location associated with a Cartesian coordinate system.

15. The system of claim 10, wherein the locator is configured to forecast the location of the speaker based on a plurality of criteria, wherein the plurality of criteria is at least one of a date, a time, and a plurality of historic locations.

16. The system of claim 10, further comprising:
an authentication component able to permit or deny access to a resource responsive to determining the location of the speaker, wherein the component is associated with an access control system, wherein the access control system is associated with the environment.

17. The system of claim 10, wherein the speech engine is configured to automatically generate a voiceprint of a speaker from an utterance, wherein the speech engine is able to match the voiceprint to a speaker identity, wherein the speaker identity is associated with a user credentials associated with a computing system.

18. The system of claim 10, wherein the speech engine fails to match the voiceprint with an existing user identity, programmatically assigning a temporary user identity to the voiceprint.

19. A computer program product comprising a non-transitory computer readable storage medium having computer usable program code embodied therewith, the computer usable program code comprising:
  computer usable program code stored in a non-transitory storage medium, if said computer usable program code is run by a processor it is operable to receive a speech from a speaker proximate to at least one of a plurality of microphones within an environment, wherein the plurality of microphones is at least one of a directional microphone and an omni-directional microphone, wherein the speaker is a personnel;
  computer usable program code stored in a non-transitory storage medium, if said computer usable program code is run by a processor it is operable to process the speech to produce an utterance to determine the identity of the speaker, wherein the identity of the speaker is associated with a voiceprint, wherein the identity is associated with a user credentials of a computing system, wherein the user credentials uniquely identifies the user within the computing system;
  computer usable program code stored in a non-transitory storage medium, if said computer usable program code is run by a processor it is operable to analyze the utterance to establish a zone in which the speaker is present, wherein the zone is a bounded region within the environment, wherein analyzing the utterance by running the computer usable program code comprises a triangulation computation that determines a user location based in part upon acoustic echoes unique to the bounded region resulting from the speech or from ambient noise in the environment;
  and computer usable program code stored in a non-transitory storage medium, if said computer usable program code is run by a processor it is operable to map the zone within the environment to determine a location of the speaker, wherein the location is at least one of a relative and absolute location.

20. The computer program product of claim 19, further comprising:
  computer usable program code stored in a non-transitory storage medium, if said computer usable program code is run by a processor it is operable to receive a voiceprint from a computing device associated with the speaker identity, wherein the speaker identity is associated with a user of the computing system;
  computer usable program code stored in a non-transitory storage medium, if said computer usable program code is run by a processor it is operable to store the voiceprint and a speaker identity within a voiceprint database;
  computer usable program code stored in a non-transitory storage medium, if said computer usable program code is run by a processor it is operable to subsequently determine the identity of the speaker based on a speech utterance associated with the user, wherein the determining matches the identity of a speaker to a voiceprint within the voiceprint database; and
  computer usable program code stored in a non-transitory storage medium, if said computer usable program code is run by a processor it is operable to establish the location of the speaker via the speech utterance.

21. A computer system comprising:
  one or more processors, one or more computer-readable memories and one or more computer-readable, tangible storage devices;
  program instructions, stored on at least one of the one or more storage devices for processing by at least one of the one or more processors via at least one of the one or more memories, to receive a speech from a speaker proximate to at least one of a plurality of microphones within an environment;
  program instructions, stored on at least one of the one or more storage devices for processing by at least one of the one or more processors via at least one of the one or more memories, to process the speech to produce an utterance to determine the identity of the speaker, wherein the identity of the speaker is associated with a voiceprint, wherein the identity is associated with a user credentials of a computing system, wherein the user credentials uniquely identifies the user within the computing system;
  program instructions, stored on at least one of the one or more storage devices for processing by at least one of the one or more processors via at least one of the one or more memories, to analyze the utterance to establish a zone in which the speaker is present, wherein the zone is a bounded region within the environment, wherein the analyzing of the utterance by processing the program instructions comprises of at least one triangulation computation that determines a user location based in part upon acoustic echoes unique to the bounded region resulting from the speech or from ambient noise in the environment; and
  program instructions, stored on at least one of the one or more storage devices for processing by at least one of the one or more processors via at least one of the one or more memories, to map the zone within the environment to determine a location of the speaker.

22. The system of claim 21, wherein the microphones in the environment are stationary microphones not associated with a mobile device able to be carried by the speaker.

23. The system of claim 21, further comprising:
  a speech engine of a speech processing system configured to determine the location of a speaker within the environment; and
  a data store for persisting at least one voiceprint used to determine the identity of the speaker.

24. A computer program product comprising:
  one or more computer-readable, tangible storage devices;
  program instructions, stored on at least one of the one or more storage devices, to receive a speech from a speaker proximate to at least one of a plurality of microphones within an environment;
  program instructions, stored on at least one of the one or more storage devices, to process the speech to produce an utterance to determine the identity of the speaker, wherein the identity of the speaker is associated with a voiceprint, wherein the identity is associated with a user credentials of a computing system, wherein the user credentials uniquely identifies the user within the computing system, wherein the identity is determined by:
I) identifying a voiceprint database, wherein the voiceprint database comprises of at least one voiceprint associated with a speaker;
II) matching the utterance of the speaker to a voiceprint within the voiceprint database, wherein the matching fails to match an utterance of the speaker to a voiceprint within the voiceprint database, establishing the speaker identity as a guest to the zone;

program instructions, stored on at least one of the one or more storage devices, to analyze the utterance to establish a zone in which the speaker is present, wherein the zone is a bounded region within the environment, wherein analyzing the utterance by the programming instructions comprises a triangulation computation that determines a user location based in part upon acoustic echoes unique to the bounded region resulting from the speech or from ambient noise in the environment; and     program instructions, stored on at least one of the one or more storage devices, to map the zone within the environment to determine a location of the speaker.

\* \* \* \* \*